T. T. PARKER.
STEAM BOILER.
APPLICATION FILED NOV. 16, 1916.
1,224,662. Patented May 1, 1917.
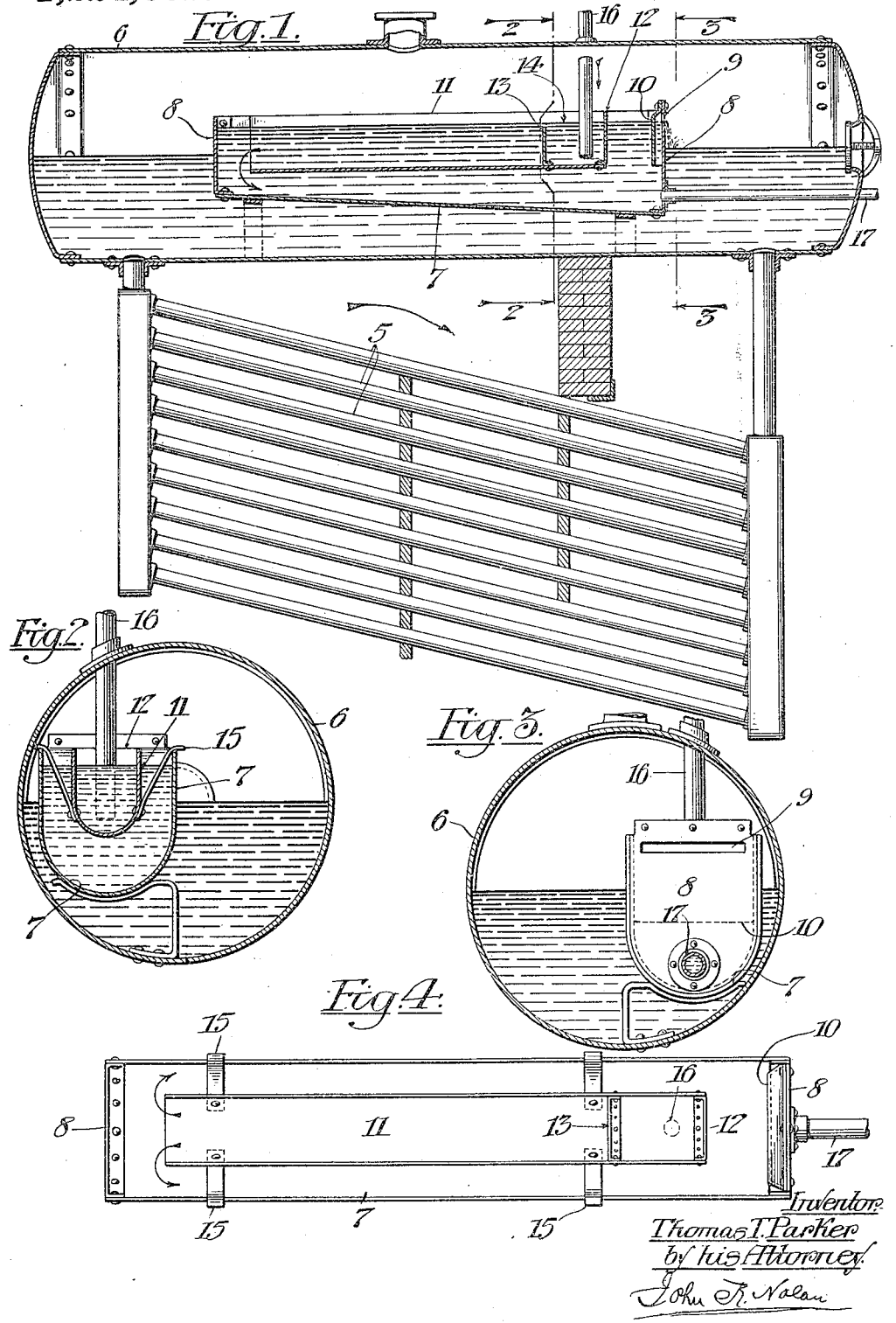
Inventor
Thomas T. Parker
by his Attorney
John R. Nolan

UNITED STATES PATENT OFFICE.

THOMAS T. PARKER, OF NEW YORK, N. Y.

STEAM-BOILER.

1,224,662.   Specification of Letters Patent.   Patented May 1, 1917.

Application filed November 16, 1916. Serial No. 131,648.

*To all whom it may concern:*

Be it known that I, THOMAS T. PARKER, a citizen of the United States, and resident of the city of New York, in the county of Kings and State of New York, have invented certain new and useful Improvements in Steam-Boilers, of which the following is a specification.

This invention relates to horizontal steam boilers, having especial reference to water-tube boilers in which a steam-and-water drum is employed.

The principal object of my invention is to provide a feed-water apparatus of novel and efficient construction and operation whereby feed-water is preheated to the temperature of the boiler water; whereby foreign substances in the feed-water are prevented from entering the boiler proper, and whereby the interior of the apparatus can be readily inspected and cleaned as occasion may require.

The form of embodiment of my invention herein illustrated comprises an open-top main receptacle, which is supported within the drum of the boiler at one side thereof, having at one end a feed-water outlet located above the normal boiler-water level and having also a depending shield directly in front of the outlet; an auxiliary open-top elongated receptacle supported within, and above the bottom of the main receptacle, said auxiliary receptacle being of less depth, length and width than the main receptacle and being headed at the end adjacent the said outlet and open at the opposite end. A transverse partition is arranged within the auxiliary chamber adjacent the closed end thereof to provide a supplemental chamber to which the feed-water is initially delivered.

The invention also comprises various novel features of construction whereby advantages are secured, all of which will be hereinafter described and claimed.

In the drawings—

Figure 1 is a longitudinal vertical section of a water-tube boiler provided with a feed-water apparatus embodying the principle of my invention.

Figs. 2 and 3 are transverse vertical sections as on the lines 2—2 and 3—3 respectively of Fig. 1.

Fig. 4 is a plan of the feed-water structure.

Referring to the drawings, 5 designates the water-tubes, and 6 the steam-and-water drum of a horizontal boiler. Within and longitudinally of the drum, adjacent one side thereof, is supported an open-top receptacle, constituting a feed-water chamber, the walls of which are partly submerged in the hot boiler water within the drum. In the present instance this receptacle is a trough-like structure comprising a curved body member 7 having end heads 8, one of which has formed therein, adjacent its upper edge, a feed water outlet 9, preferably in the form of an elongated slot through which the feed-water flows in a film-like stream from the receptacle into the boiler proper. A depending plate 10 is affixed to and spaced from the inner side of the slotted end head so as to provide a shield or trap which precludes the passage of flocculent and other floating substances to the outlet.

Within the feed-water chamber is appropriately suspended an auxiliary receptacle which is of less depth, length and width than the chamber so as to leave ample water space between the two receptacles. This auxiliary receptacle comprises a curved body member 11 having an end head 12 adjacent the slotted head of the main receptacle, the opposite end of the auxiliary receptacle being open as shown. A transverse partition 13 is arranged adjacent the end head 12 to provide a supplemental water chamber 14 within the auxiliary receptacle. The upper edge of the partition is slightly below the level of the outlet 9 as shown. In the present instance the auxiliary receptacle is furnished with pairs of laterally projecting arms 15 which are adapted to rest upon the upper edges of the side walls of the main receptacle and thereby detachably support the auxiliary receptacle in position with its end head adjacent the slotted end of the main receptacle.

A feed-water supply pipe 16 depends into the supplemental chamber, and a blow-off pipe 17 extends from one end of the main receptacle through an opening in the adjacent head of the steam and water drum.

By the foregoing described construction it will be seen that feed-water entering the chamber 14 rises therein to the top of the partition 13 and flows thereover to and along the main chamber of the auxiliary receptacle, thence passing through the open end of the latter into and along the main receptacle. When the supply of feed-water to the two receptacles reaches the level of the outlet 9 the water escapes through the latter into the boiler-proper as above mentioned. During its prolonged flow through the receptacles the feed water is effectually preheated not only by the direct contact of the steam therewith but by the radiated heat from the walls of the outer receptacle which are partially immersed into the hot boiler water. The hot feed-water dissolves the soluble substances therein, the heavier matter dropping to the bottoms of the receptacles and the lighter matter rising to the surface of the feed-water. The accretions of floating substances, which are prevented by the shield 10 from escaping through the outlet into the boiler proper as above mentioned, finally fall to the bottom, whence they, together with the contents of both receptacles, may be readily expelled from time to time through the blow-off pipe 17.

Inasmuch as the feed-water receptacles are not exposed to the direct action of the products of combustion from the furnace there is no liability of the mud and other accretions in such receptacles being baked or burned into hard cement scale.

The outflow from the supplemental chamber being relatively lower than the outlet 9 as above explained, an efficient water seal for the delivery end of the feed-pipe is provided, which seal prevents steam from entering the pipe and thus effectually avoids liability of water hammer.

Apart from the features above pointed out whereby the feed-water is efficiently preheated and whereby the escape of foreign substances to the boiler proper is prevented, my invention provides a feed-water apparatus of such character that ample room for entry into and inspection of the interior of the boiler drum is permitted, and that the interior of the apparatus can be thoroughly examined and cleaned. The auxiliary receptacle being readily removable from and replaceable within the main receptacle materially facilitates the inspection and cleaning operations by a person within the boiler.

It is to be understood that the details of construction above set forth may be variously modified within the principle of my invention and the scope of the appended claims:

I claim—

1. In a horizontal steam-boiler, an open-top main receptacle within the same having at one end a feed-water outlet located above the normal boiler-water level and having also a depending shield directly in front of the outlet, an auxiliary open-top elongated receptacle supported within the main receptacle above the bottom of the latter, said auxiliary receptacle being closed at that end adjacent the said outlet and open at the opposite end, and means for supplying feed-water to said auxiliary receptacle.

2. In a horizontal steam-boiler, an open-top main receptacle within the same having at one end a feed-water outlet located above the normal boiler-water level and having also a depending shield directly in front of the outlet, an auxiliary open-top elongated receptacle removably suspended within the main receptacle above the bottom of the latter, said auxiliary receptacle being closed at that end adjacent the said outlet and open at the opposite end, and means for supplying feed-water to said auxiliary receptacle.

3. In a horizontal steam-boiler, an open-top main receptacle within the same having at one end a feed-water outlet located above the normal boiler-water level and having also a depending shield directly in front of the outlet, an auxiliary open-top elongated receptacle supported within the main receptacle above the bottom of the latter, said auxiliary receptacle being closed at that end adjacent the said outlet and open at the opposite end, and having a transverse partition adjacent said closed end to provide within the auxiliary receptacle a supplemental chamber having an overflow below the level of the said outlet, and means for supplying feed-water to said chamber.

4. In a horizontal steam-boiler, an open-top main receptacle within the same having at one end a feed-water outlet located above the normal boiler-water level and having also a depending shield directly in front of the outlet, an auxiliary open-top elongated receptacle removably suspended within the main receptacle above the bottom of the latter, said auxiliary receptacle being closed at that end adjacent the said outlet and open at the opposite end, and having a transverse partition adjacent said closed end to provide within the auxiliary receptacle a supplemental chamber having an overflow below the level of the said outlet, and means for supplying feed-water to said chamber.

5. In a horizontal steam boiler, an open-top main receptacle within the same having at one end a feed-water outlet located above the normal boiler-water level and having also a depending shield directly in front of the outlet, an auxiliary open-top elongated receptacle provided with laterally-projecting supporting members adapted to be seated on the walls of the main receptacle, said auxiliary receptacle being closed at that end adjacent the said outlet and open at the opposite end and having a transverse partition adjacent said closed end to provide within the auxiliary receptacle a supplemental chamber having an overflow below the level of the said outlet, and means for supplying feed-water to said chamber.

6. In a horizontal steam boiler, an open-top main receptacle within the same having at one end a feed-water outlet located above the normal boiler-water level and having also a depending shield directly in front of the outlet, an auxiliary open-top elongated receptacle supported within the main receptacle above the bottom of the latter, said auxiliary receptacle being closed at that end adjacent the said outlet and open at the opposite end, and having a transverse partition adjacent said closed end to provide a supplemental chamber within the auxiliary receptacle, the top of said partition being below the level of the said outlet, a feed-water pipe opening into said chamber at a level below the top of the partition, and a blow-off pipe extending from the lower portion of the main receptacle through the drum.

Signed at New York in the county and State of New York, this 15th day of November A. D. 1916.

THOMAS T. PARKER.

Copies of this patent may be obtained for five cents each, by addressing the "Commissioner of Patents, Washington, D. C."